(12) United States Patent
Kusume

(10) Patent No.: US 7,391,827 B2
(45) Date of Patent: Jun. 24, 2008

(54) APPARATUS AND METHOD FOR PROVIDING AN ESTIMATE OF A TRANSMIT SEQUENCE

(75) Inventor: Katsutoshi Kusume, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 11/510,210

(22) Filed: Aug. 24, 2006

(65) Prior Publication Data

US 2007/0058757 A1   Mar. 15, 2007

Related U.S. Application Data

(63) Continuation of application No. PCT/EP2004/001873, filed on Feb. 25, 2004.

(51) Int. Cl.
*H04L 27/06* (2006.01)
*H04L 1/02* (2006.01)
*H04B 1/10* (2006.01)

(52) U.S. Cl. .................. 375/340; 375/347; 375/346
(58) Field of Classification Search .......... 375/340, 375/347, 350, 346, 267, 233
See application file for complete search history.

(56) References Cited

U.S. PATENT DOCUMENTS

| | | | |
|---|---|---|---|
| 6,704,354 B1 * | 3/2004 | Kim et al. | 375/229 |
| 7,139,320 B1 * | 11/2006 | Singh et al. | 375/260 |
| 2002/0034161 A1 | 3/2002 | Deneire et al. | |
| 2005/0147025 A1 * | 7/2005 | Auer | 370/203 |

FOREIGN PATENT DOCUMENTS

WO    WO 00/24170    4/2000

OTHER PUBLICATIONS

International Search Report dated Dec. 13, 2004.
International Preliminary Examination Report dated May 9, 2006.
Basu, et al., "Multichannel Permutation Filters," IEEE, pp. 370-373 (1995).
Biglieri, et al., "Decoding Space-Time Codes with BLAST Architectures," IEEE, pp. 303-307 (2002).
Hassibi, "A Fast Square-Root Implementation for BLAST," IEEE, pp. 1255-1259 (2000).
Wolniansky, et al., "V-BLAST: An Architecture for Realizing Very High Data Rates Over the Rich-Scattering Wireless Channel," IEEE, pp. 295-300 (1998).
Baro, et al., "Improving BLAST Performance Using Space-Time Block Codes and Turbo Decoding," IEEE, pp. 1067-1071 (2000).
Benjebbour, et al., "Comparison of Ordered Successive Receivers for Space-Time Transmission," IEEE, pp. 2053-2057 (2001).

(Continued)

*Primary Examiner*—Temesghen Ghebretinsae
(74) *Attorney, Agent, or Firm*—John J. Penny, Jr.; Edwards Angell Palmer & Dodge LLP

(57) ABSTRACT

Apparatus and method of providing an estimate of a transmit sequence from a receive sequence. The transmit sequence includes transmit sequence values. The transmit sequence value is transmittable by one of a group of transmitting points through a communication channel of a plurality of communication channels to a receiving point. The communication channel extends from a transmitting point to a receiving point. The receive sequence includes an interference of transmit sequence values.

28 Claims, 11 Drawing Sheets

OTHER PUBLICATIONS

Wubben, et al., "Efficient Algorithm for Detecting Layered Space-Time Codes," 4th International ITG Conference on Source and Channel Coding, pp. 1-7 (2002).

Wubben, et al., "Efficient Algorithm for Decoding Layered Space-Time Codes," Electric Letters, pp. 1348-1350 (2001).

Zha, et al., "Modified Decorrelating Decision-Feedback Detection of BLAST Space-Time System," IEEE, pp. 335-339 (2002).

Bohnke, et al., "Reduced Complexity MMSE Detection for BLAST Architectures," IEEE, pp. 2258-2262 (2003).

Hassibi, "An Efficient Square-Root Algorithm for BLAST," IEEE, pp. 737-740 (2000).

Biglieri, et al., "Decoding Space-Time Codes with BLAST Architectures," IEEE, pp. 2547-2252 (2002).

Ginis, et al., "On the Relation Between V-BLAST and the GDFE," IEEE, pp. 364-366 (2001).

G. H. Golub and C.F.V. Loan, "Matrix Computations," 3$^{rd}$ Ed., John Hopkins Univ. Press, 1996, section 4.2.9.

* cited by examiner

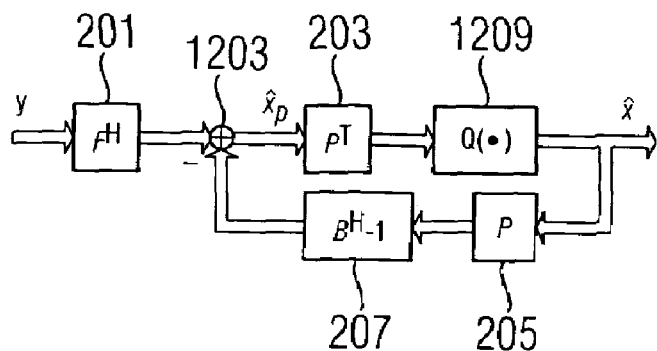

P is permutation matrix, represents detection order
$PP^T = P^T P = 1$

→ Jointly optimize $F^H$, $B^H$, and $P$

Error covariance matrix: $\Phi_{\varepsilon\varepsilon,p} = B^H P \Phi_{\varepsilon\varepsilon} P^T B$ Key equation: $\boxed{P_0 \Phi_{\varepsilon\varepsilon} P_0^T = LDL^H}$ Optimum solution: $P = P_0$ and $B^H = L^{-1}$ MSE of data streams: $\Phi_{\varepsilon\varepsilon,p} = D = \text{diag}(d_1,..., d_{N_T})$ Iterative direction →

→ Find *minimum* $d_i$ at every iteration of Key equation

FIG 6A

1: $\Phi_{\varepsilon\varepsilon} = (\Phi_{xx}^{-1} + H^H \Phi_{nn}^{-1} H)^{-1}$ ——601

$P_0 = 1_{N_T}, D = 0_{N_T}$ ——602 for $i = 1, \ldots, N_T$ $q = \arg\min_{q'=i,\ldots,N_T} \Phi_{\varepsilon\varepsilon}(q', q')$ ——603

$P_i = 1_{N_T}$ of $i$-th and $q$-th rows exchanged ——604

$P_0 = P_i P_0$ ——605

$\Phi_{\varepsilon\varepsilon} = P_i \Phi_{\varepsilon\varepsilon} P_i^T$ ——606

$D(i,i) = \Phi_{\varepsilon\varepsilon}(i,i)$ ——607

$\Phi_{\varepsilon\varepsilon}(i:N_T, i) = \Phi_{\varepsilon\varepsilon}(i:N_T, i) / D(i,i)$ ——608

$\Phi_{\varepsilon\varepsilon}(i+1:N_T, i+1:N_T) = \Phi_{\varepsilon\varepsilon}(i+1:N_T, i+1:N_T)$ ——609
$\quad -\Phi_{\varepsilon\varepsilon}(i+1:N_T, i) \Phi_{\varepsilon\varepsilon}(i+1:N_T, i)^H D(i,i)$ end 13: $L$ = lover triangular part of $\Phi_{\varepsilon\varepsilon}$ ——610

14: $B^H = L^{-1}$, $F^H = DL^H P_0 H^H \Phi_{nn}^{-1}$ ——611

FIG 6B $\hat{x}_p = F^H y, \hat{x} = 0_{N_T \times 1}, B^H = B^H - 1_{N_T}$

2: for $i = 1, \ldots, N_T$ $q = \text{find}(P_0(i,:) == 1)$ ——612

$\hat{x}(q) = Q(\hat{x}_p(i))$ ——613

$\hat{x} = \hat{x} - B^H(:,i) \hat{x}(q)$ ——614 end

FIG 6C

1: $\Phi_{\varepsilon\varepsilon}^{-1} = \Phi_{xx}^{-1} + H^H \Phi_{nn}^{-1} H$ all appearance of $\Phi_{\varepsilon\varepsilon}$ is replaced by $\Phi_{\varepsilon\varepsilon}^{-1}$ 13: $R$ = upper triangular part of $\Phi_{\varepsilon\varepsilon}^{-1}$ 14: $B^H = R, F^H = D^{-1} R^{H,-1} P_O H^H \Phi_{nn}^{-1}$

FIG 6D

2: for $i = N_T, \ldots, 1$

APPARATUS AND METHOD FOR PROVIDING AN ESTIMATE OF A TRANSMIT SEQUENCE

CROSS-REFERENCE TO RELATED APPLICATION

This application is a continuation of copending International Application No. PCT/EP2004/001873, filed Feb. 25, 2004, which designated the United States and was not published in English, and is incorporated herein by reference in its entirety.

BACKGROUND OF THE INVENTION

1. Field of the Invention

The present invention is in the field of telecommunications and, in particular, in the field of equalization in a multiple input scenario, in which a receiver receives signals from more than one transmit antenna.

2. Description of Related Art

The steadily-increasing demand for high data rates necessary for todays and future mobile radio applications requires high data rate transmission techniques efficiently exploiting the available bandwidth or, in other words, the achievable channel capacity. Therefore, multiple input multiple output (MIMO) transmission systems have achieved considerable importance in recent years. MIMO systems employ a plurality of transmitting points, each of the transmitting points having a transmit antenna, and a plurality of receiving points, each of the receiving points having a receiving antenna, for receiving signals being transmitted by the multiple transmitting points through different communication channels.

For example, an enormous capacity increase can be achieved on a multiple input multiple output channel in rich scattering environments. The capacity increase is linear with a number of transmit antennas unless it exceeds a number of receive antennas. In order to enable highly reliable communications in such a system, maximum-likelihood detection would be the optimum way, however, as the number of transmit antennas increases, the complexity of the receiver becomes prohibitive.

The increasing receiver complexity with increasing number of transmit antennas results from an increasing number of communication channels to be taken into account in order to detect the information transmitted by the number of transmit antennas from a signal received by a further number of receive antennas. In P. W. Wolniansky, G. J. Foschini, G. D. Golden and R. A. Valenzuela, "V-Blast: An Architecture for Realizing Very High Data Rates Over the Rich-Scattering Wireless Channel", in URSI International Symposium on Signals, Systems, and Electronics, September 1998, pp. 295-300, a vertical bell labs layered space-time (V-Blast) detection scheme with lower complexity is disclosed. Independent data streams associated with different transmit antennas, called layers, are detected at a receiver by nulling out interference of other layers from each other in a successive manner.

Moreover, it was suggested, to perform an optimum detection ordering which is of great importance for the successive interference cancellation, whereby, at each detection stage, a transmit signal value estimate associated with a smallest estimation error is provided.

The V-Blast detection scheme mentioned above calculates the nulling vector based on a zero forcing (ZF) criterion. S. Böro, G. Bauch, A. Pavlic, and A. Semmerl. "Improving BLAST Performance using Space-Time Block Codes and Turbo Decoding," in Proc. IEEE Global Telecommunications Conference (GLOBECOM 2000), vol. 2, November/December 2000, pp. 1067-1071 and A. Benjebbour, H. Murata, and S. Yoshida. "Comparison of Ordered Successive Receivers for Space-Time Transmissions," in Proc. IEEE Vehicular Technology Conference (VTC 2001-Fall), Atlantic City, USA, October 2001, pp. 2053-2057, disclose detection schemes where a minimum mean square error (MMSE) criterion is adapted to the V-Blast architecture improving the performance. These detection schemes require calculation of either pseudo inverse (ZF V-Blast) or inverse (MMSE V-Blast) of a matrix at each detection stage, i.e., at every step of layer detection, which is still computationally expensive and prohibitive for large number of data streams. Therefore, the estimation complexity associated with the above-mentioned detection schemes is enormous.

For the ZF criterion, a reduction of complexity is possible. In D. Wübben, R. Böhnke, J. Rinas, V. Kühn and K. D. Kammeyer, "Efficient Algorithm for Decoding Layered Space-Time Codes," IEE Electronics Letters, vol. 37, no. 22, pp. 1348-1350, October 2001 and in D. Wübben, J. Rinas, R. Böhnke, V. Kühn and K. D. Kammeyer, "Efficient Algorithm for Decoding Layered Space-Time Codes," in Proc. Of 4. ITG Conference on Source and Channel Coding, Berlin, January 2002, pp. 399-405, computational reduction schemes are proposed which are based on QR decomposition with suboptimum detection ordering.

In W. Zha and S. D. Blostein, "Modified Decorrelating Decision-Feedback Detection of BLAST Space-Time System," in Proc. IEEE Int. Conference on Communications (ICC 2002), vol. 1, New York, USA, April/May 2002, pp. 335-339 discloses a Cholesky factorization which is utilized with reordering by unitary transformation at every detection stage leading to optimum ordering.

A similar contribution based on QR decomposition for MMSE criterion is disclosed in R. Böhnke, D. Wübben, V. Kühn, and K. D. Kammeyer, "Reduced Complexity MMSE Detection for BLAST Architecture," in Proc. IEEE Global Telecommunications Conference (GLOBECOM 2003), vol. 4, San Francisco, USA, December 2003, pp. 2258-2262. The ordering disclosed therein is suboptimum which leads to an increased detection error.

In B. Hassibi, "An Efficient Square-Root Algorithm for BLAST," in Proc. IEEE Int. Conference on Acoustics, Speech, and Signal Processing. (ICASSP'00), vol. 2, Istanbul, June 2000, pp. II737-II740, a unitary transformation is disclosed for reordering. In E. Biglieri, G. Taricco and A. Tulino, "Decoding Space-Time Codes With BLAST Architectures," IEEE Transactions on Signal Processing, vol. 50, no. 10, pp. 2547-2552, October 2002, a Cholesky factorization is disclosed which, however, does not involve an ordering strategy and, therefore, does not lead to an optimum performance.

In other words, the prior art approaches disclose either a reduction of complexity associated with a suboptimum detection ordering, which leads to an increased estimation error, or an optimum reordering for reduction of the estimation error at a cost of an increased complexity.

FIG. 10 shows a system model of MIMO channel. The system is equipped with $N_T$ transmit antennas and $N_R$ receive antennas, where $N_T \leq N_R$. In the following, it is assumed, that the signals are narrow band so that a non-dispersive fading channel is present. Moreover, FIG. 10 shows a discrete time system model in an equivalent complex baseband.

The channel inputs $x_i$, $i=1, \ldots, N_T$ are complex valued baseband signals and are transmitted from $N_T$ antennas simultaneously. In other words, each transmit antenna transmits a channel input value of the channel input sequence. The channel tap gain from transmit antennas i to receive antenna j is denoted by $h_{j,i}$.

These channel taps are independent zero mean complex Gaussian variables of equal variance $E[|h_{j,i}|^2]=1$. This assumption of independent paths holds if antenna spacing is sufficiently large and if the system is surrounded by rich scattering environment. The signal at receive antenna j can be expressed by $$y_j = \sum_{i=1}^{N_T} h_{j,i} x_i + n_j,$$

where y=Hx+n is an additive noise at receive antenna j. By collecting the receive signal values determined by the above equation for $N_R$ receive antennas, the receive signals can be concisely expressed in matrix form $$y = Hx + n_j$$

where $$H = \begin{bmatrix} h_{1,1} & \cdots & h_{1,N_T} \\ \vdots & \ddots & \vdots \\ h_{N_R,1} & \cdots & h_{N_R,N_T} \end{bmatrix},$$

$y=[y_1, \ldots, y_{N_R}]^T$, $x=[x_1, \ldots, x_{N_T}]^T$, $n=[n_1, \ldots, n_{N_R}]^T$, and $(\bullet)^T$ denotes transposition.

FIG. 11 demonstrates a detection procedure of V-Blast. The receive signal $y=y_1$, which is a vector, is filtered by a filter with coefficients $f_{k_1}^H$ to estimate the $k_1$-th data stream which is the most reliable estimate among all $N_T$ entries of x, i.e., with minimum MSE at this first stage. The output is quantized by Q(•) and decision is made on $x_{k_1}$. Assuming that this decision is correct ($\hat{x}_{k_1}=x_{k_1}$), contribution of $x_{k_1}$ on the receive signal $y_1$ is subtracted by multiplying $x_{k_1}$ with the corresponding channel impulse response $h_{k_1}$, which is a vector, which is the $k_1$-th column of H. This procedure is repeated $N_T$ times until all the entries of x are detected.

In the following, a detailed filter calculation and ordering strategy according to the above prior art approach will be described.

An error signal of a linear filter $F^H$ is expressed as $$\epsilon = F^H y - x.$$

The linear MMSE filter can be found by applying an orthogonality by principle, i.e., $E[\epsilon y^H]=0$. From the above equations, a solution is given by $$F^H = \Phi_{xx} H^H (H \Phi_{xx} H^H + \Phi_{nn})^{-1},$$

where covariance matrices of channel input and noise are defined as $$\Phi_{xx} = E[xx^H] \text{ und } \Phi_{nn} = E[nn^H].$$

Assuming that the covariance matrices in the above equation are invertible, the above equation for the linear filter may be represented in an alternative form $$F^H = (\Phi_{xx}^{-1} + H\Phi_{nn}^{-1} H^H)^{-1} H^H \Phi_{nn}^{-1}$$

where the known matrix inversion lemma has twice been applied to obtain the above equation. From the above, the error covariance matrix reads as $$\Phi_{\epsilon\epsilon} = E[\epsilon\epsilon^H] = (\Phi_{xx}^{-01} + H^H \Phi_{nn}^{-1} H)^{-1}.$$

It is to be noted that the diagonal entries of $\Phi_{\epsilon\epsilon}$ are MSE, i.e., $E[|x_i-\hat{x}_i|^2]$, $i=1, \ldots, N_T$. Thus, the $k_1$-th data stream having the minimum diagonal entry of $\Phi_{\epsilon\epsilon}$ can be seen as the most reliable one in the MMSE sense and must be detected at the first stage in order to avoid error propagation, which corresponds to the optimum ordering mentioned above.

The corresponding filter $f_{k_1}^H$ corresponds to the $k_1$-th row of $F^H$. At the second stage, since $k_1$-th entry of x has been detected, the $k_1$-th column of the channel matrix H can be neglected, leading to an updated system only with $N_T-1$ transmit antennas.

In order to generalize the procedure, a deflated channel matrix $H^{(i)}$ is introduced where columns $k_1, \ldots, k_{i-1}$ of H are replaced by zeros for $i=2, \ldots, N_T$ and $H^{(1)}=H$. At i-th stage, $\Phi_{\epsilon\epsilon}^{(i)}$ and $F^{(i),H}$ are calculated from the above equations by replacing H with $H^{(i)}$. Then, the optimum detection scheme can be described as $$k_i = \underset{k \notin \{k_1, \ldots, k_{i-1}\}}{\operatorname{argmin}} e_k^T \Phi_{\epsilon\epsilon}^{(i)} e_k$$

$$f_{k_i}^H = e_{k_i}^T F^{(i),H} = e_{k_i}^T \Phi_{\epsilon\epsilon}^{(i)} H^H \Phi_{nn}^{-1},$$

where $e_k$ is the k-th column of an identity matrix of size $N_T$ and the last step follows from the equations mentioned above. Therefore, MMSE-V-Blast repeats the procedure and requires matrix inverse calculations $N_T$ times for each receive sequence, which is computationally expensive. In other words, the above-discussed detection scheme applies an optimum ordering, so that a resulting estimation error is reduced. This error reduction is however, associated with an enormous computational complexity.

In E. Bigliei, g. Taricco and A. Tulino, "Decoding Space-Time Codes With BLAST Architectures," IEEE Transactions on Signal Processing, vol. 50, no. 10, pp. 2547-2552, October 2002, and in G. Ginis and J. M. Cioffi, "On the Relation Between V-BLAST and the GDFE," IEEE Communications Letters, vol. 5, no. 9, pp. 364-366, September 2001, the V-Blast architecture is described by a pair of forward and backward block filters with certain constraint on the backward filter structure. A resulting block diagram is shown in FIG. 12.

The sequence estimator shown in FIG. 12 comprises a forward filter 1201 having a number of inputs corresponding to a number of receive antennas, and a number of outputs coupled to a subtractor 1203. The subtractor 1203 has a number of outputs 1205 and a number of further inputs 1207. In other words, the filter 1201 is the previously mentioned forward filter. The number of outputs 1205 of the subtractor 1203 is coupled to a quantizer 1209 being operative for performing a hard decision. The quantizer has a number of outputs 1211 corresponding to the number of transmit antennas (or number of channel inputs). The number of outputs 1211 is fed back to a backward filter 1213 having a number of outputs corresponding to the number of receive antennas. The number of outputs of the backward filter 1213 is coupled to the number of further inputs 1207 of the subtractor 1203.

The estimate of a transmit sequence is provided via the number of outputs 1211 of the quantizer 1209. The estimates detected by the quantizer 1209 are filtered by the backward filter 1213, and filtered detected estimates are subtracted from filtered values provided by the forward filter 1201 in order to reduce intersymbol interferences. Therefore, the structure shown in FIG. 12 can be considered as a decision-feedback equalizer (DFE) structure, which is equivalent to the structure of FIG. 11.

The feedback filter $B^H$ must be unit lower (or upper) triangular so that the outputs of $B^H-1$ are not subtracted from already detected signals. This is the causality constraint which is necessary to describe the successive interference cancellation procedure properly. In this context, a unit lower (upper) triangular matrix is a lower (upper) triangular matrix with one ("1") values along the main diagonal.

However, the above-discussed approach suffers from the disadvantage, that there is no concern about detection ordering. In other words, the approach shown in FIG. 12 assumes that the detection ordering is already optimum, which is not the case all the time. Although the detection scheme associated with the structure shown in FIG. 12 has reduced complexity with respect to the estimation scheme of FIG. 11, it suffers from an increased estimation error in a case of a non-optimum decision ordering, i.e., in the case when the input sequence values are not reordered in such a way that the decision ordering is optimum.

SUMMARY OF THE INVENTION

It is the object of the present invention to provide an efficient concept for estimating a transmit sequence with low complexity and optimum detection ordering.

In accordance with a first aspect, the present invention provides an apparatus providing an estimate of a transmit sequence from a receive sequence, the transmit sequence comprising $N_T$ transmit sequence values, wherein a transmit sequence value is transmittable by one of $N_T$ transmitting points through a communication channel of a plurality of communication channels to a receiving point of $N_R$ receiving points, wherein the communication channel extends from a transmitting point to a receiving point, wherein the receive sequence comprises an interference of transmit sequence values, the apparatus having means for providing information on an estimation error associated with the estimate of transmit sequence; means for calculating permutation information using the information on the estimation error; a processor for processing the receive sequence to obtain a permuted filtered sequence, wherein the processor is operative for filtering using channel information and permuting using the permutation information such that the permuted filtered sequence values are in such an order that estimation error values associated with the values of the estimate of the transmit sequence are in a predetermined order; an interference canceller for reducing interference using the permuted filtered sequence and the permutation information to provide the estimate of the transmit sequence, the interference canceller comprising a subtractor for subtracting a feedback sequence from the permuted filtered sequence for reducing the interference to provide an interference-reduced sequence, a decider for providing the estimate of the transmit sequence from the interference-reduced sequence, and a feedback element for weighting the estimate of the transmit sequence to provide the feedback sequence.

In accordance with a second aspect, the present invention provides a method for providing an estimate of a transmit sequence from a receive sequence, the transmit sequence comprising $N_T$ transmit sequence values, wherein a transmit sequence value is transmittable by one of $N_T$ transmitting points through a communication channel of a plurality of communication channels to a receiving point of $N_R$ receiving points, wherein the communication channel extends from a transmitting point to a receiving point, wherein the receive sequence comprises an interference of transmit sequence values, with the steps of providing information on an estimation error associated with the estimate of the transmit sequence; calculating the permutation information using the information on the estimation error such that the permuted filtered sequence values are processing the receive sequence to obtain a permuted filtered sequence using channel information and permutation information, the processing comprising filtering using channel information and permuting using the permutation information such that the permuted filtered sequence values are in such an order that estimation error values associated with the values of the estimate of the transmit sequence are in a predetermined order; interference cancelling for reducing interferences using the permuted filtered sequence and the permutation information to provide the estimate of the transmit sequence, the interference cancelling comprising subtracting a feedback sequence from the permuted filtered sequence for reducing the interference to provide an interference-reduced sequence, providing the estimate of the transmit sequence from the interference-reduced sequence by deciding on an estimate value in the estimate of the transmit sequence from a value in the interference-reduced sequence, and weighting the estimate of the transmit sequence to provide the feedback sequence.

In accordance with a third aspect, the present invention provides a computer program having a program code for performing the above mentioned method, when the computer program runs on a computer The present invention is based on the finding, that an efficient estimation scheme, or in other words, an efficient detection scheme, can be obtained when a permutation information indicating a reordering of values in a set of values such that an optimum detection ordering can be achieved, is explicitly included for optimization of the estimation scheme.

In accordance with the present invention, the permutation information is derived from an information on an estimation error associated with an estimate of the transmit sequence, wherein the estimate of the transmit sequence is obtained from a received version of the transmit sequence, i.e., a receive sequence. Since the permutation information for permuting, i.e., reordering, values to be detected is derived from the information on the estimation error, an optimum permutation can be performed leading to an optimum detection ordering. For example, the information on an estimation error comprises mean squared errors associated with each value of the estimate of the transmit sequence. As has been mentioned above, the optimum detection ordering is obtained, when the estimation errors associated with subsequent values to be detected are in an ascending order, i.e., the first error value is smaller than a second error value following the first error value. Therefore, the permutation information can directly be derived from the error information so that the values to be ordered are reordered before detecting so that the required optimum detection ordering is achieved.

In contrast to the embodiment of FIG. 12, FIG. 2 illustrates the structure of the present invention which includes permutation. The estimation error and the complexity can simultaneously be reduced, when, by the way of example only, coefficients of the forward filter 201 and coefficients of the backward filter 207 are simultaneously calculated and optimized by explicitly using the permutation information represented by permutation matrices 203 and 205, so that a complexity reduction and an optimum detection ordering, i.e. an estimation error reduction, can simultaneously be achieved. Still in reference to the embodiment of FIG. 2 by the way of example only, the feedforward and the backwards filters as well as the optimum detection ordering are jointly optimized. For example, the ordering, represented by the permutation information, which can be a permutation matrix, is explicitly included for optimization formulation for the feedforward filter and for a interference canceller comprising the backward filter shown in FIG. 2.

The present invention, generally, provides a concept for estimation of a transmit sequence from a receive sequence in a multiple input multiple output scenario. In accordance with the present invention, the receive sequence is processed by a processor in order to obtain a permuted filter sequence. For example, the inventive processor performs a filtering and permutation operation simultaneously. The filtering task is preferably performed using channel information and the permutation task is performed using the permutation information. The processor is, therefore, not a filter in a traditional sense since value reordering determined by the permutation information and filtering are performed.

In order to obtain the permutation information, the invention provides means for providing information on an estimation error associated with the estimate of the transmit sequence. The estimation error, which can be represented as a vector comprising a plurality of estimation error values associated with values of the estimate of transmit sequence, can be for example, obtained from a solution based on the above-mentioned orthogonality principle, wherein for example a Wiener optimization equation is solved in a minimum mean squared error sense, by the way of example only. In this case, the estimation error depends, for example, on a transmit signal power, on a noise power and on the communication channel represented, for example, by a channel matrix describing the MIMO channel. Therefore, the estimation error can be determined for example in advance without a necessity of a knowledge of the estimate of the transmit sequence for the following reasons. The transmit signal power is usually known a priori for a given communication system. A noise power can be, for example, determined at a receiver from, for example, a covariance of the receive sequence which always can be estimated. The information on the communication channel, for example, a channel matrix mentioned above is usually estimated at a receiver by a channel estimator. For example, the channel estimator provides an estimate of the channel matrix on a basis of pilot sequences transmitted from the transmitting points to the receiving points for channel estimation purposes.

In order to calculate the necessary permutation information for achieving the optimum detection ordering and the complexity reduction, the present invention further provides means for calculating the permutation information using, preferable, the estimation error only. For example, the means for calculating the permutation information is operative for calculating a permutation matrix which can be combined with a filtering matrix, so that the permuted filtered sequence values provided by the inventive processor are in such an order that an optimum detection ordering is achieved, i.e., in such an order that estimation error values associated with the values of the estimate of the transmit sequence are in a predetermined order, for example, in the previously mentioned ascending order.

Since the permuted filtered sequence provided by the inventive processor actually represents a possible estimate of a transmit sequence, a simple hard decision detector can be provided in order to make a decision on values of the estimate of the transmit sequence.

However, the detected values mentioned above may further comprise an interference of further transmit signal values caused by the communication channel. This interference is actually included in the permuted filtered sequence provided by the processor. In order to reduce interferences and to provide the estimate of the transmit sequence which has a reduced estimation error compared to the inventive approach mentioned above, the present invention further provides an interference canceller for reducing interferences by performing a subtraction operation using a permuted filtered sequence in order to provide the estimate of the transmit sequence. More specifically, all operands required for interference reduction by means of subtraction are derivable from the permuted filtered sequence. For example, the interference canceller comprises a feedback loop, so that the estimates of the transmit sequence or weighted versions thereof are subtracted from the permuted filtered sequence.

It is the advantage of the present invention, that the inventive estimation scheme has a reduced complexity compared with the prior art approaches and, simultaneously, a reduced estimation error since an optimum detection ordering can be achieved by the means of introducing the permutation information.

Moreover, the complexity can further be reduced when a suboptimum detection ordering is allowable.

The inventive complexity reduction is, however, not compromised by a deterioration of a performance, so that the same performance can be achieved with significantly lower complexity compared to the prior art approaches relying on optimum detection ordering.

BRIEF DESCRIPTION OF THE DRAWINGS

Preferred embodiments of the present invention will be detailed subsequently referring to the appended drawings, in which:

FIG. 3 demonstrates the inventive joint optimization using the permutation information for the case of the embodiment of FIG. 2;

FIGS. 6a-6d demonstrate the inventive joint determination of the permutation information and filtering parameters;

DESCRIPTION OF THE PREFERRED EMBODIMENTS

Figure 1:
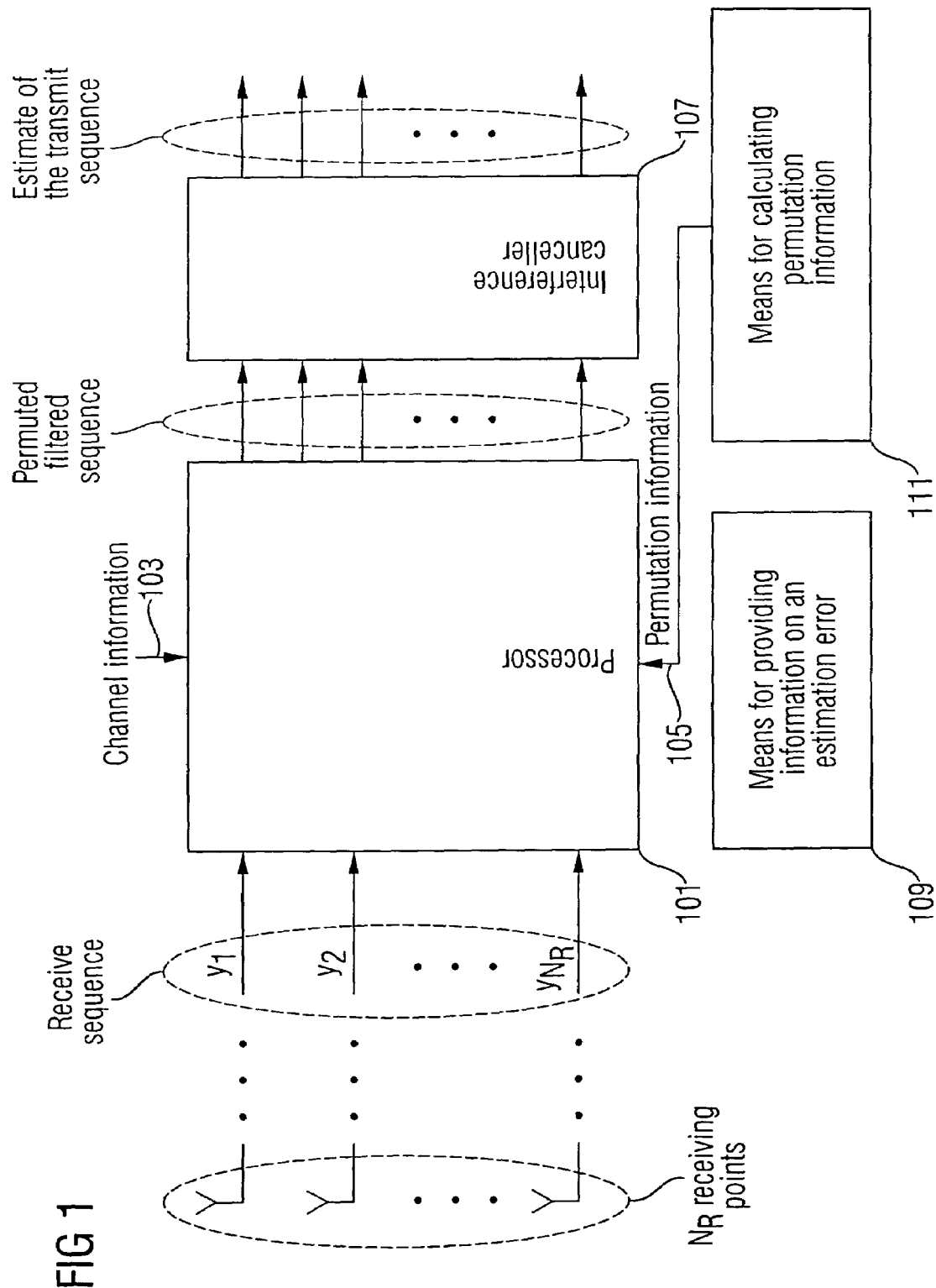
FIG. 1 shows a block diagram of an inventive apparatus for providing an estimate of a transmit sequence in accordance with a first embodiment of the present invention.

The apparatus shown in FIG. 1 comprises a processor 101 having $N_R$ inputs, wherein $N_R$ is a number of receiving points, each of the receiving points comprising a receive antenna. The processor further comprises a first input 103, a second input 105 and a number of outputs.

The number of outputs of the processor 101 is coupled to an interference canceller 107, wherein the interference canceller 107 has a number of outputs, wherein the number of outputs of the interference canceller 107 corresponds to the number of outputs of the processor 101.

The apparatus of FIG. 1 further comprises means 109 for providing information on an estimation error. The means 109 for providing the information has an output coupled to means 111 for calculating permutation information. The means 111 for calculating has an output coupled to the second input of the processor 101.

As it is depicted in FIG. 1, the receive sequence provided to the inputs of the processor 101 comprises $N_R$ receive sequence values, wherein each receive sequence value is provided to a different input of the processor 101. Moreover, the receive sequence is a version of a transmit sequence being transmittable from $N_T$ transmitting points to the $N_R$ receiving points depicted in FIG. 1. Each of the receiving points comprises a receive antenna and a number of analogue and digital processing means, for example, a band pass filter and a analogue to digital converter, which means are not shown in FIG. 1, in order to provide the receive sequence.

More specifically, a transmit sequence value is transmittable by one of $N_T$ transmitting points through a communication channel of a plurality of communication channels to a receiving point of $N_R$ receiving points, wherein the communication channel extends from the transmitting point to the receiving point. However, the receiving point also receives a further transmit sequence value being transmittable by a further transmitting point through a further communication channel extending from the further transmitting point to the receiving point, so that interference occurs. Therefore, the receive sequence comprises an interference of transmit sequence values and channel influence. Moreover, the receive sequence is corrupted by channel noise.

The inventive processor 101 is operative for processing the receive sequence in order to obtain a permuted filtered sequence, wherein the processor 101 is operative for processing the receive sequence using channel information and permutation information, as has been explained above. The channel information is supplied via the first input 103 and the permutation information is calculated by the means 111 for calculating, whereby information on the estimation error associated with the estimate of the transmit sequence is used. The means 111 for calculating is operative for calculating the permutation information such that the permuted filtered sequence values are in such an order that estimation error values associated with the values of the estimate of the transmit sequence provided by the interference canceller 107 are in the predetermined order, for example in an ascending order or in a descending order.

The interference canceller 107 receives the permuted filtered sequence provided by the processor 101 and reduces interferences by performing a subtraction operation using the permuted filtered sequence to provide the estimate of the transmit sequence via the number of outputs, as has been explained above.

In accordance with the present invention, the information on the estimation error can be provided in a form of elements of an error matrix, for example of an error covariance matrix, as the information on the estimation error, such that a diagonal of the error matrix comprises estimation error values. In this context, an estimation error value indicates an estimation error associated with a value of the estimate of the transmit sequence, wherein each estimation error value may be, for example, a mean squared error (MSE) or a minimum mean squared error (MMSE) value, as has been mentioned above. Therefore, the means 109 for providing information on the estimation error may be operative for calculating the error matrix from a minimisation of a mean MSE between, for example, the permuted filtered sequence and the estimate of the transmit sequence such that the estimation error values are MSE values. As has been mentioned above, the information on the estimation error, e.g. the error matrix can be calculated without referring to the estimate of the transferred sequence. This issue will be addressed later.

In the following, the inventive concept will be explained.

More specifically, the inventive means 109 for providing information on the estimation error is operative for calculating the error matrix such that the error matrix comprises a transmit sequence covariance matrix, wherein the transmit sequence covariance matrix comprises a transmit sequence power, or a noise covariance matrix including the noise power or a channel matrix comprising the channel impulse responses of the plurality of communication channels extending from the transmitting points to the receiving points.

In the following, the inventive concept will be described in detail, whereby, for the sake of clarity and consistency, the prior art structure shown in FIG. 12 will serve as a starting point in order to derive the inventive optimised estimation scheme.

Figure 12:
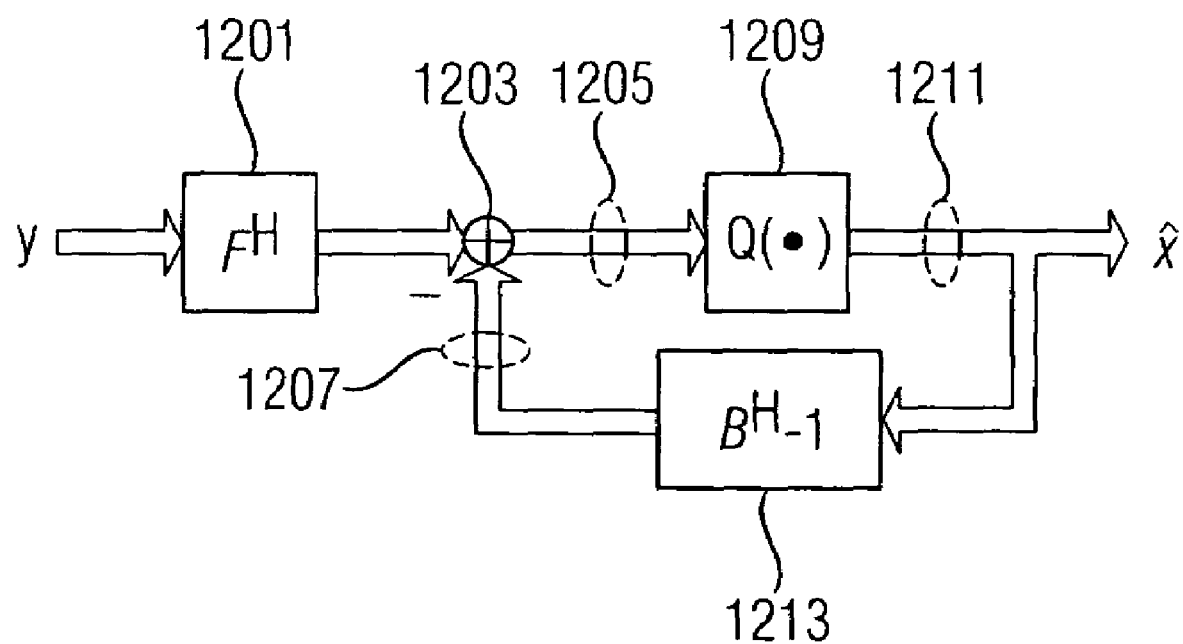
FIG. 12 shows a block DFE structure.

In contrast to the approach shown in FIG. 12, the present invention explicitly includes detection ordering in the optimisation formulation, as has been explained above.

Figure 2:
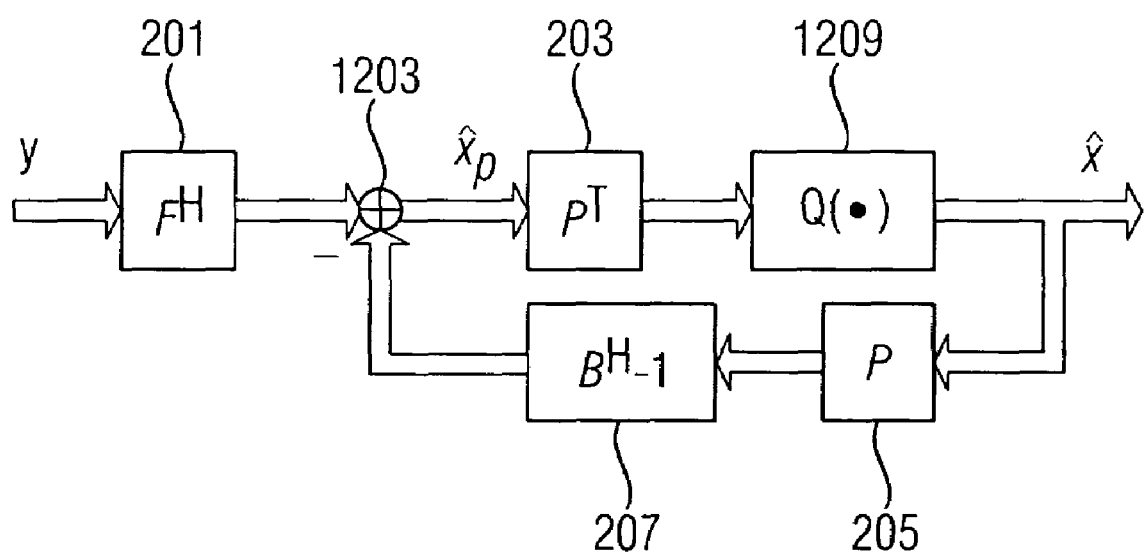
FIG. 2 shows a block diagram of an apparatus for providing an estimate of a transmit sequence in accordance with a further aspect of the present invention.

FIG. 2 shows a system model used for the subsequence derivation of a MMSE block decision feed-back equalizer taking into account decision ordering represented by a permutation matrix P, wherein the permutation matrix represents the permutation information.

The apparatus of FIG. 2 comprises a filter 201 which corresponds to the processor 101 discussed above. The filter 201 has a number of inputs for receiving the receive sequence y and a plurality of outputs coupled to the subtractor 1203. A plurality of outputs of the subtractor 1203 is coupled to means for permuting 203. The means for permuting 203 has a plurality of outputs coupled to, by the way of example only, the decider 1209. A plurality of outputs of the decider 1209 is fed back to the subtractor via a further means 205 for permuting and means 207 for weighting, wherein the means 207 may, for example, perform a filtering operation, as has been explained in connection with the embodiment of FIG. 12.

As has been mentioned above, the apparatus shown in FIG. 2 explicitly exploits the permutation information given by the permutation matrix P. As is depicted in FIG. 2, the further means 205 for permuting applies the permutation matrix P to the estimate of the transmit sequence. Contrary thereto, the permuting means 203 applies a transpose of the matrix P for permuting, i.e. reordering values in a set of values provided by the subtractor 1203.

In this context, a permutation matrix P is an identity matrix with its rows reordered, wherein the following relation holds:

$$PP^T = P^TP = 1.$$

In the following, coefficients of the inventive filter 201, coefficients used by the means 207 for weighting and coefficients of the permutation matrix P will be determined.

As has been mentioned above, P is introduced in order to express detection ordering. In accordance with the present invention, the estimated signal $\hat{x}_p$ is optimised, which can be expressed as $$\hat{x}_p = F^H y - (B^H - 1) P \hat{x},$$

where subscript p states that the variable is permuted by the permutation matrix P. The desired signal for $\hat{x}_p$ is the channel input x, but it is permutated. Therefore, the error vector reads as $$\epsilon_p = P x - \hat{x}_p = B^H P x - F^H y.$$

By orthogonality principle, i.e. $E[\epsilon_p y^H]=0$, the coefficients of the filter 201, which can be considered as being a feedforward filter, can be expressed in terms of a feedback filter $$F^H = B^H P \Phi_{xy} \Phi_{yy}^{-1}$$

where covariance matrices are defined as $$\Phi_{xy} = E[xy^H] = \Phi_{xx} H^H$$

$$\Phi_{yy} = E[yy^H] = H \Phi_{xx} H^H + \Phi_{nn}$$

From the above equations, the error matrix, which is the error covariance matrix in this case with ordering is expressed as $$\Phi_{\epsilon\epsilon,p} = E[\epsilon_p \epsilon_p^H] = B^H P \Phi_{\epsilon\epsilon} P^T B.$$

The diagonal entries of $\Phi_{\epsilon\epsilon,p}$ represent MSE of ordered data streams.

Since $\Phi_{\epsilon\epsilon}$ is symmetric, and assuming that it is also positive definite, there exists a permutation matrix $P_o$, a unit lower triangular matrix L, and a diagonal matrix D which have the following relation:

$$P_o \Phi_{\epsilon\epsilon} P_o^T = L D L^H$$

It is to be noted that the above equation as a key equation states, that the permutation matrix $P_o$, which represents the inventive permutation information is generally derivable from, for example, Cholesky factorization of $\Phi_{\epsilon\epsilon}$ with symmetric permutation. A Cholesky factorization is described in G. H. Golub and C. F. V. Loan, "Matrix Computations", 3$^{rd}$ ed. The Johns Hopkins University Press. 1996".

With the above equation, the error covariance matrix with ordering can be rewritten as $$\Phi_{\epsilon\epsilon,p} = B^H P P_o^T L D L^H P_o P^T B$$

In accordance with the present invention, the following choice of detection ordering and coefficients of the feedback filter, i.e. of coefficients used by the inventive means 207 for weighting, $$P = P_o \text{ und } B^H = L^{-1},$$

leads to error covariance matrix which is white, $$\Phi_{\epsilon\epsilon,p} = D = \text{diag}(d_1, \ldots, d_{N_T}).$$

The diagonal entries $d_1, \ldots, d_{N_T}$ are MSE of ordered data stream.

The key equation for determining the coefficients of the permutation matrix can be solved, for example, iteratively.

In FIG. 3, the inventive concept described above is summarized. The inventive goal is to jointly optimise $F^H$, $B^H$ and P. In order to determine the error covariance matrix including the permutation information P, the key equation is considered. The optimum solution of the key equation, i.e. the choice of detection ordering and feedback filter mentioned above leads to the inventive optimum detection ordering and to the inventive complexity reduction. In order to determine $P_o$ and L, the matrix appearing on the left hand side of the key equation is factorised, so that a MSE of data streams is obtained. In accordance with the present invention, the factorization is performed such that a minimum $d_i$ at every iteration of key equation is found.

In FIG. 3, the iterative direction is explicitly depicted. As mentioned above, the key equation can be solved iteratively, so that after a number of iteration steps the diagonal matrix D is obtained. In order to obtain the diagonal matrix D, the present invention further provides a factorization scheme, which will be discussed later.

From the above identified equations, the coefficients of the feedforward filter 201 are calculated as $$F^H = D L^H P_o H^H \Phi_{nn}^{-1}$$

In order to obtain the permuted filtered sequence, the receive signal is filtered by a noise decorrelator, matched to channel, and the signals are permuted according to the inventive optimum detection ordering. Furthermore, a weighting processing by $L^H$ in forward direction is performed, wherein $L^H$ is upper triangular. Then, the gain is controlled by the real valued diagonal matrix D. In the feedback section, after the proper ordering, interference cancellation in backward direction is performed, wherein $L^{-1} - 1$ is strictly lower triangular.

In accordance with the present invention, the means 109 for providing information on the estimation error is operative for calculating the error covariance matrix $\Phi_{\epsilon\epsilon}$ from $$\Phi_{\epsilon\epsilon} = (\Phi_{xx}^{-1} + H^H \Phi_{nn}^{-1} H)^{-1}$$

wherein $\Phi_{xx}^{-1}$ denotes an inverse of the transmit sequence covariance matrix, $\Phi_{nn}^{-1}$ denotes an inverse of a noise covariance matrix and H denotes the channel matrix, wherein $(\bullet)^H$ denotes a conjugation and transposition.

In order to find an optimum solution, the means 109 for providing the information on the estimation error may be operative for performing the matrix inversion appearing in the above equation. However, this matrix inversion is to be performed only once per receive sequence. If the transmit sequence can be considered as being an uncorrelated process, then the transmit sequence covariance matrix is a diagonal matrix. In this case, a calculation of the inverse of the transmit sequence covariance matrix is not computational expensive. The same considerations apply to the inverse of the noise covariance matrix.

In accordance with a further aspect of the present invention, the means 109 for providing information on the estimation error may be operative for iteratively calculating the error covariance matrix or an inverse thereof from a previously calculated error covariance matrix or from an inverse thereof and from an update information on the channel matrix or on the transmit sequence covariance matrix or on the channel noise covariance matrix. Therefore, the error covariance matrix is to be used for the current receive sequence is an update of previously calculated error covariance matrix for a previous receive sequence.

As has been explained above, the inventive means 111 for calculating the permutation information is operative for calculating the permutation matrix $P_o$ as the permutation information based on the key equation explained above, namely $$P_o \Phi_{\epsilon\epsilon} P_o^T = L D L^H$$

or for calculating the permutation information based on the following equation $$P_o \Phi_{\epsilon\epsilon}^{-1} P_o^T = L D L^H$$

wherein $\Phi_{\epsilon\epsilon}^{-1}$ denotes an inverse of the error covariance matrix (error matrix) as the information on the estimation error, L denotes a lower triangular matrix comprising ones in a diagonal, and D denotes a diagonal matrix comprising estimation error values in the predetermined order, as has been explained above.

In accordance with the present invention, the permutation information can also be obtained when an inverse error matrix is used as the information on the estimation error. In this case, the matrix inversion mentioned above can be omitted, so that a further complexity reduction is obtained. Since this approach defers from the above-explained optimum detection ordering approach using the error matrix as channel information, it will be referred to in the following as suboptimum approach. This issue will be discussed in the following in detail.

The proposed optimum order approach based on the matrix factorization using the error covariance matrix leads to calculate the previously mentioned matrix inverse in order to determine the error covariance matrix. The factorization can be performed by the means of the previously mentioned Cholesky approach. In order to avoid this matrix inversion, a matrix factorization, for example, a Cholesky factorization with symmetric permutation for $$\Phi_{\epsilon\epsilon}^{-1} = \Phi_{xx}^{-1} + H^H \Phi_{nn}^{-1} H,$$

which is $$P'_o \Phi_{\epsilon\epsilon}^{-1} P'_o{}^T = R^H D'R$$

where R is unit upper triangular. The above equation corresponds to the previously mentioned equation $P_o \Phi_{\epsilon\epsilon}^{-1} P_o^T = LDL^H$, wherein R denotes $L^H$, D' denotes D and $P_0'$ denotes $P_0$. It is to be noted here that, for example, the matrix R obtains from a factorization of the above equation may defer from the matrix $L_H$ calculated in the optimum detection ordering case.

If it is assumed that the feedback filter $B^H$ being used by the means 207 for weighting shown in FIG. 2 is unit upper triangular instead of unit lower triangular, then, in a similar way as has been described above, an optimum feed back and detection ordering can be found as $$B_H = R \text{ und } P = P'_o$$

and the inventive feedforward filter being operative for performing the operative processing is found to be $$F^H = D'^{-1} R^{H,-1} P'_o H^H \Phi_{nn}^{-1}.$$

More specifically, the above equation determines a processing scheme to be performed by the inventive processor 101 in order to provide the permuted filtered sequence for the suboptimum case.

With the above choice for R and P, the error covariance matrix (error matrix) with ordering reads as $$\Phi_{\epsilon\epsilon,p} = D'^{-1} = \text{diag}(d'_1{}^{-1}, \ldots, d'_{N_T}{}^{-1})$$

again, the diagonal entries in the above equation represents MSE of data streams. For example, the iterative algorithm of Cholesky factorization with symmetric permutation determines diagonal entries starting from $d'_1$. However, the upper triangular structure of the feedback filter suggests to detect the ordered data stream from the last. Therefore, a direction of optimisation is reversed. Contrary to the optimum case, which minimises MSE of the worst (data stream to be detected first), the inventive suboptimum case maximise MSE of the best (data stream to be detected last) because the last data stream does not cause error propagation to the others.

Consequently, although this approach requires further less computation, it does not lead to the optimum detection ordering. However, an additional reordering, e.g. by unitary transformation, can be performed to further improve the performance at low additional computational cost.

Figure 4:
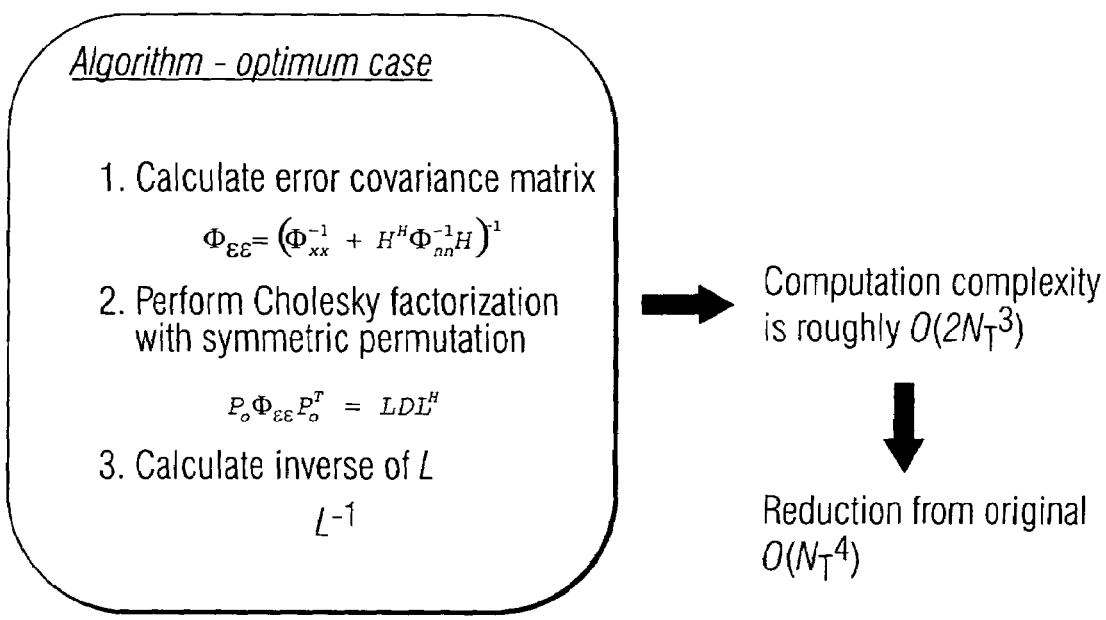
FIG. 4 demonstrates the inventive approach in the case of optimum detection ordering.

FIG. 4 summarizes the inventive approach for the optimum case. First, the error covariance matrix is calculated. In a next step, a Cholesky factorization is performed with symmetric permutation. In a next step, an inverse of L is calculated. This algorithm has a computational complexity detected in FIG. 4, which is clearly lower than the original computational complexity, also depicted in FIG. 4.

Figure 5:
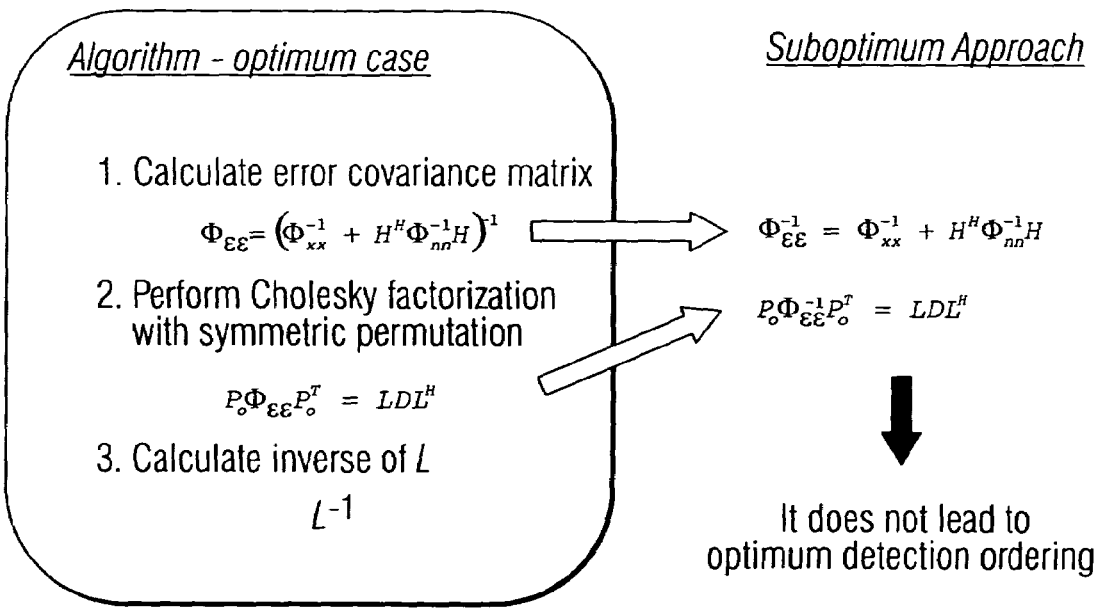
FIG. 5 demonstrates the inventive approach in the case of suboptimum detection ordering.

FIG. 5 demonstrates the difference between the inventive optimum case and the inventive suboptimum approach. Instead of the error matrix, an inverse thereof is used, so that a Cholesky factorization with symmetric permutation is performed with respect to a matrix comprising the inverse of the error covariance matrix. A next step, an inverse of matrix L is calculated.

The inventive means 111 for calculating the permutation information may be operative for calculating the permutation matrix $P_o$ such that D, which is a diagonal matrix, comprises estimation error values in an ascending order or in a descending order as the predetermined order, as has been mentioned above. This issue will be addressed in the following.

In "G. H. Golub and C. F. V. Loan, Matrix Computations, 3rd ed. The Johns Hopkins University Press. 1996", an iterative algorithm is disclosed for performing a matrix factorization. The algorithm disclosed therein finds a maximum diagonal entry at each iteration, starting from $d_1$, and corresponding necessary permutation. This choice of maximum diagonal entry is aimed for numerical stability in order to calculate the factorization for positive semi-definite system. However, the inventive approach is contrary thereto. Since the diagonal entries of the matrix D used in the inventive system are MSE of ordered data streams, the inventive choice is opposite. To be more specific, at each iteration, a minimum diagonal entry corresponding to a minimum MSE is chosen.

FIGS. 6a, 6b, 6c, and 6d demonstrate the inventive matrix factorization approach.

FIG. 6a demonstrates the inventive calculation of block DFE filters with detection ordering for the optimum case. First, the error covariance matrix is determined, as is depicted by reference No. 601. In a next step denoted by the reference No. 602, initial values for the permutation matrix and for the matrix D are set. In a next step, $N_T$ iterations are performed. At the beginning of the iteration, denoted by 603, a minimum diagonal entry in the error covariance matrix is searched. In the next step 604, i-th and q-th rows are exchanged in a identity matrix. In the next step, the permutation matrix is updated, as is denoted in the line referenced by 605. In a next step referenced by 606, an update of the error covariance matrix is performed. In the next step 607, a i-th diagonal entry of the matrix D is obtained from a i-th diagonal entry of the updated error covariance matrix. In the next step 608, the updated error covariance matrix is updated again by the means of dividing by the i-th diagonal entry of the matrix D. In the next step 609, a new error covariance matrix is calculated, wherein the new error covariance matrix serves as the actual error covariance matrix in a further iteration step. After $N_T$ iterations, the matrix L is obtained as a lower triangular part of the error covariance matrix, which is denoted by 610. In a next step 611, coefficients of the inventive filter are calculated.

FIG. 6b demonstrates a block DFE detection for the optimum case in accordance with the present invention, wherein the detection is, by the way of example only, performed by the means of $N_T$ iterations. In a first iteration step 612, a i-th entry, which is equal to 1, is searched in the permutation matrix and an index q is obtained indicating a position of the entry. In a next step 613, a q-th estimate is obtained by the means of hard decision applied to a set of values comprising the estimate of the transmit sequence. In this context, Q denotes the decision operation.

In a next step 614 the interference cancelling subtraction operation mentioned above is performed.

FIG. 6c demonstrates the inventive calculation of block DFE filters with detection ordering for the suboptimum case, wherein, for the sake of descriptional simplicity, only a difference with respect to the embodiment of FIG. 6a is shown. First, an inverse of the error covariance matrix is calculated. Furthermore, all appearance of the error covariance matrix is replaced by the inverse thereof. In step 13, the matrix R is calculated as an upper triangular part of the inverse of the error covariance matrix. In step 14, coefficients of the inventive filter and of the inventive means for weighting are calculated.

FIG. 6d demonstrates the inventive block DFE detection for the suboptimum case, wherein, for the sake of descriptional simplicity, only a difference with respect to the embodiment of FIG. 6b is depicted. More specifically, the iteration variable i is counted upwards starting from $N_T$ and ending with 1.

As has been explained above, the permutation information can iteratively be determined by performing a Cholesky factorization. However, in accordance with the present invention, any matrix factorization can be performed in order to obtain the permutation matrix.

In accordance with a further aspect of the present invention, the inventive means 111 for calculating the permutation information is operative for calculating the permutation matrix from a factorization of a matrix, which can be a Cholesky factorization, such that D comprises estimation error values in an ascending order as the predetermined order. More specifically, the inventive means 111 for calculating the permutation information comprises in this case a minimum searcher for searching a minimum diagonal entry in the matrix to be factorised and means for reordering the matrix to provide a reordered matrix such that a first diagonal entry in the reordered matrix is the minimum diagonal entry, and means for performing a factorization of the reordered matrix.

Referring again to the inventive processor 111, the coefficients of the inventive filter may be determined from combining the matrices determined above. Since the inventive filter performs filtering a permutation, this operation defines a processing rule to be performed by the inventive processor. However, the processing rule may result from only partially applying the inventive results. To be more specific, the inventive processor may be operative in accordance with a further aspect of the present invention, for filtering and permuting the receive sequence in order to provide the permuted filtered sequence according to a processing rule $$P_o H^H$$

wherein H is a channel matrix for filtering, the channel matrix comprising channel impulse responses of the plurality of communication channels including the channel information, and wherein $P_o$ is the permutation matrix including the permutation operation.

Furthermore, the inventive processor 101 may be operative for performing the processing rule defined as follows $$DL^H P_o H^H$$

wherein D is the diagonal matrix comprising the estimation error values in an ascending or descending order as the predetermined order wherein the matrix L is the matrix mentioned above.

Moreover, the inventive processor 111 may further comprise a filter for filtering the receive sequence using filtering coefficients determined by $H^H$ in order to provide a filtered sequence, a permutator for permuting the filtered sequence using permutation coefficients determined by $P_o$ to provide a permuted sequence, means for weighting the permuted sequence using weighting coefficients defined by $L^H$ in order to provide a weighted sequence, and means for weighting the weighting sequence using weighting coefficients defined by D in order to provide the permuted filtered sequence.

Moreover, the processor 111 may be operative for filtering the receive sequence using noise information in accordance with a processing rule defined by $$DL^H P_o H^H \Phi_{nn}^{-1}$$

In other words, the inventive processor 101 is a filter having a filter comprising filter coefficients determined by the above equation.

However, the inventive processor 101 may further comprise a noise filter, which is a noise decorrelation filter, for filtering the receive sequence in order to provide a noise filtered sequence as the receive sequence, wherein the noise filter is operative for filtering the receive sequence using filter coefficients determined by $$\Phi_{nn}^{-1},$$

which is an inverse of a noise covariance matrix.

Furthermore, the inventive processor 101 may further comprise means for determining the filter coefficients, the means for determining being operative for calculating the above-described expression for the filter coefficients.

As has been mentioned above, the interference to be removed results from an influence of the plurality of communication channels on the transmit sequence values so that a receive sequence value being receivable by a receiving point comprises a transmit sequence value being transmittable from a transmitting point to the receiving point through a communication channel, wherein the transmit sequence value is interfered with a further transmit sequence value being transmittable from a further transmitting point through a further communication channel to the receiving point.

The inventive interference canceller comprise a subtractor for subtracting a feedback sequence from the permuted filtered sequence provided by the inventive processor for reducing the interference in order to provide an interference-reduced sequence, and a decider for providing the estimate of the transmit sequence from the interference-reduced sequence, wherein the decider is operative for deciding on an estimate value in the estimate of the transmit sequence from a value in the interference-reduced sequence. Furthermore, the interference canceller may comprise a feedback element for weighting the estimate of the transmit sequence provided by the decider in order to provide the feedback sequence required by the subtractor for reducing the interferences.

The decider may further comprise a permutator (means for permuting) in order to take the permutation operation performed by the processor into account. More specifically, the means for permuting is operative for permuting the interference-reduced sequence in order to provide a permuted interference-reduced sequence using the permutation operation.

The decider may further comprise a detector for detecting the transmit sequence values from the permuted interference-reduced sequence values in order to provide the estimate of the transmit sequence.

The feedback element may comprise a further means for permuting (a further permutator) in order to permute (reorder) the estimate of the transmit sequence, i.e. the values comprised by the estimate, using the permutation information in order to provide a permuted estimate of the transmit sequence. The feedback element may further comprise means for weighting the permuted estimate of the transmit sequence in order to provide the feedback sequence.

The detector comprised by the decider may be a hard decision detector or a soft decision detector. Preferably, the detector is a hard decision detector.

Figure 7:
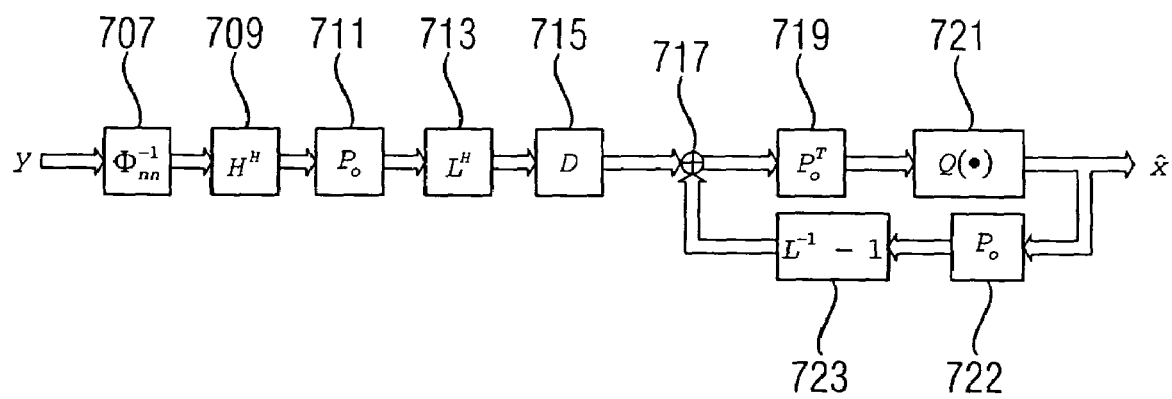
FIG. 7 shows a block diagram of an inventive apparatus for providing an estimate of a transmit sequence in accordance with a further embodiment of the present invention.

FIG. 7 shows an apparatus for providing an estimate of a transmit sequence in accordance with a further embodiment of the present invention.

The apparatus shown in FIG. 7 comprises a noise decorrelation filter 707 having an input for receiving the receive sequence at an output for providing a decorrelated sequence to a filter 709 being operative for filtering using channel information denoted by $H^H$. A filter 709 has an output coupled to means for permuting 711, wherein the means for permuting uses the permutation matrix $P_o$ as permutation information. The means 711 for permuting has an output coupled to means 713 for weighting, wherein the means 713 for weighting is operative for using weighting coefficients defined by a matrix $L^H$. The means 713 for weighting has an output coupled to a further means 715 for weighting, wherein the further 715 for weighting is operative for using weighting coefficients determined by the matrix D. The further means for weighting 715 has an output for providing the permuted filtered sequence.

It is to be noted that the elements 707, 709, 711, 713, and 715 are comprised by the inventive processor.

The apparatus shown in FIG. 7 further comprises an interference canceller comprising a subtractor 717 having a further number of inputs for receiving a feedback sequence and a number of outputs coupled to means 719 for weighting. The means 719 for weighting is operative for weighting a interference-reduced sequence provided by the subtractor using a permutation matrix, which is a transposed matrix with respect to the permutation matrix $P_o$. The means for permuting 719 is coupled to a detector 721, the detector 721 having an output for providing the estimate of the transmit sequence.

It is to be noted that the elements 719 and 721 are comprised by the inventive decision element mentioned above.

The interference canceller further comprises a feedback loop comprising a further means for permuting 722, which has a number of inputs to which a number of outputs of the detector 721 are coupled. The means 722 for permuting is operative for permuting using permuting coefficients determined by the inventive permutation matrix $P_o$. A number of outputs of the means 722 for permuting is coupled to means 723 for weighting which has a number of outputs coupled to the further number of inputs of the subtractor 717 in order to provide a feedback sequence. The means 723 for weighting is operative for multiplying a permuted estimate of the transmit sequence provided by the further means 722 for permuting by a matrix defined by $$L^{-1}-1$$

wherein $L^{-1}$ is an inverse of the matrix L mentioned above.

In order to obtain the inverse of the matrix L, the apparatus for providing the estimate of the transmit sequence may further comprise an inverter for inverting the matrix L in order to provide an inverse thereof.

Figure 8:
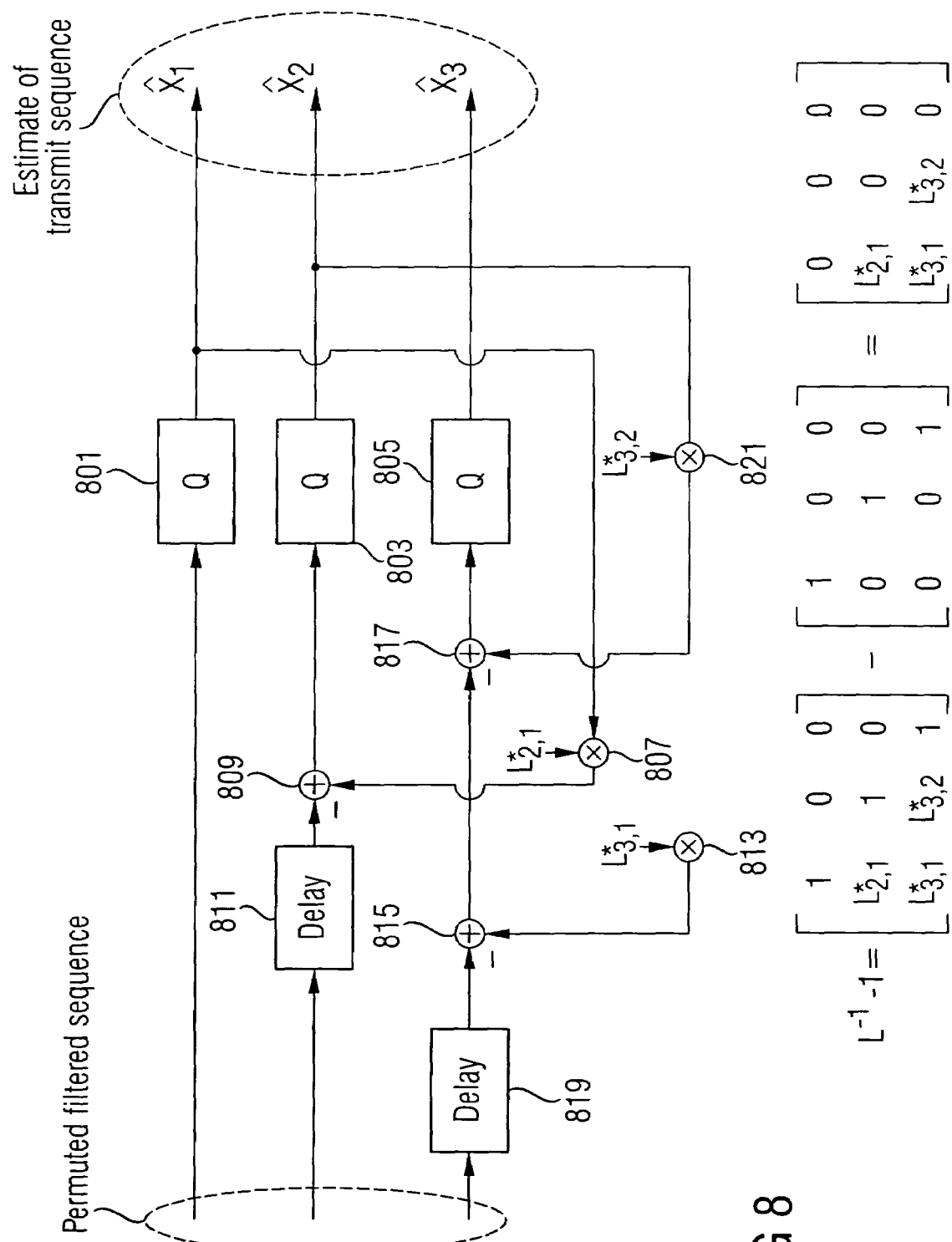
FIG. 8 shows an embodiment of the inventive interference canceller.

FIG. 8 shows a diagram of the interference canceller in accordance with a further embodiment of the present invention. In FIG. 8, for the sake of simplification, a case is considered, where the permuted filtered sequence comprises three permuted sequence values. However, following explanations generally apply for any number of permuted filtered sequence values.

The interference canceller of FIG. 8 comprises a first detector 801 having an input and an output, a second detector 803 having an input and an output and a third detector 805 having an input and an output. Generally, the interference canceller comprises N detectors, where N equals to 3 in this case.

The output of the first detector 801 is coupled to a multiplier 807, the multiplier 807 having a further input and an output coupled to a subtractor 809. The subtractor 809 has an input and an output coupled to the input of the second detector 803. To the input of the subtractor 809, an output of a delay element 811 is coupled, wherein the delay element 811 has an input.

Moreover, the output of the first detector 801 is coupled via a multiplier 813 to a subtractor 815. The subtractor 815 has an output coupled to an input of a subtractor 817, the subtractor 817 having an output coupled to the third detector 801. The subtractor 815 has a further input, to which an output of a further delay element 819 is coupled. The further delay element 819 has an input.

The output of the second detector 803 is coupled via a further multiplier 821 to a further input of the subtractor 817, which has the output coupled to the third detector 805.

The detectors 801, 803, and 805 are operative for detecting values of the estimate of the transmit sequence in parallel. Contrary to the above embodiments, the interference canceller does not explicitly perform a permutation. Instead, the permutation is taken into account by the inventive wiring scheme shown in FIG. 8 so that, as a result, the same effect can be achieved. The multiplier 807, 813, and 821 are operative for multiplying a respective value of the estimate of the transmit sequence by a coefficient of the weighting matrix $L^{-1}$, which is also depicted in FIG. 8 for the sake of clarity.

The delay elements 811 and 819 are introduced in order to take processing delays into account so that the resulting system is causal. Generally speaking, the multipliers depicted in FIG. 8 are comprised by the inventive feedback elements. For the case of N values of the interference-reduced sequence to be detected, the feedback element may comprise $(N^2-N)/2$ multipliers for multiplying the first N−1 values of the estimate of the transmit sequence by weighting coefficients in order to provide the feedback sequence provided to the subtractors shown in FIG. 8. The weighting coefficients are determined as has been described above.

The first value of the permuted filter sequence is provided directly to the detector 801 since the permuted filtered sequence is reordered such that optimum detection ordering is provided. Hence, the first value of the estimate of the transmit sequence is associated with a smallest MSE.

If the feedback sequence comprises N values, then the subtractor is operative for subtracting N values of the feedback sequence from the last N−1 values of the permuted filtered sequence in order to provide the interference-reduced sequence to be detected. This case is depicted in FIG. 8. The feedback sequence comprises a first feedback sequence value, a second feedback sequence value and a third feedback sequence value, wherein the first feedback sequence value results from multiplying a first value of the estimate of the feedback sequence by a first weighting coefficient, wherein the second feedback sequence value results from multiplying the first value of the estimate of the transmit sequence by a second weighting coefficient and wherein the third feedback sequence value results from multiplying a second value of the estimate of the transmit sequence by a third weighting coefficient. As is depicted in FIG. 8, the subtractor comprises a first subtracting element for subtracting first feedback sequence value from a second permuted filtered sequence value, which is delayed, and a second and a third subtraction element for subtracting the second feedback sequence value from the third feedback sequence value from a third permuted filtered sequence value, which can be delayed, as is depicted in FIG. 8.

Figure 9A:
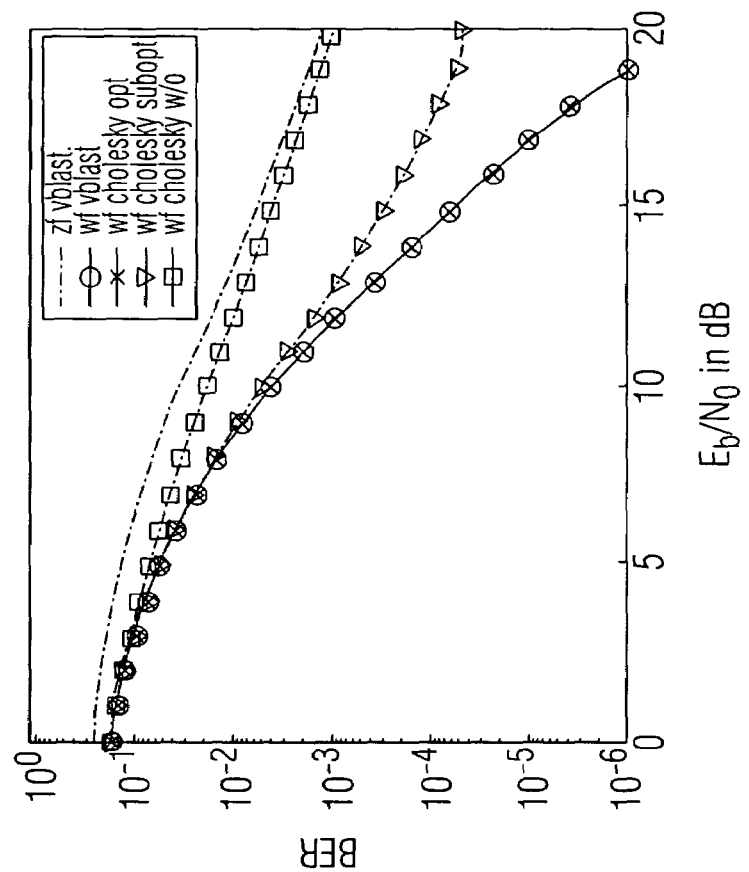
FIGS. 9a, 9b demonstrate the performance of the inventive approach.
Figure 9B:
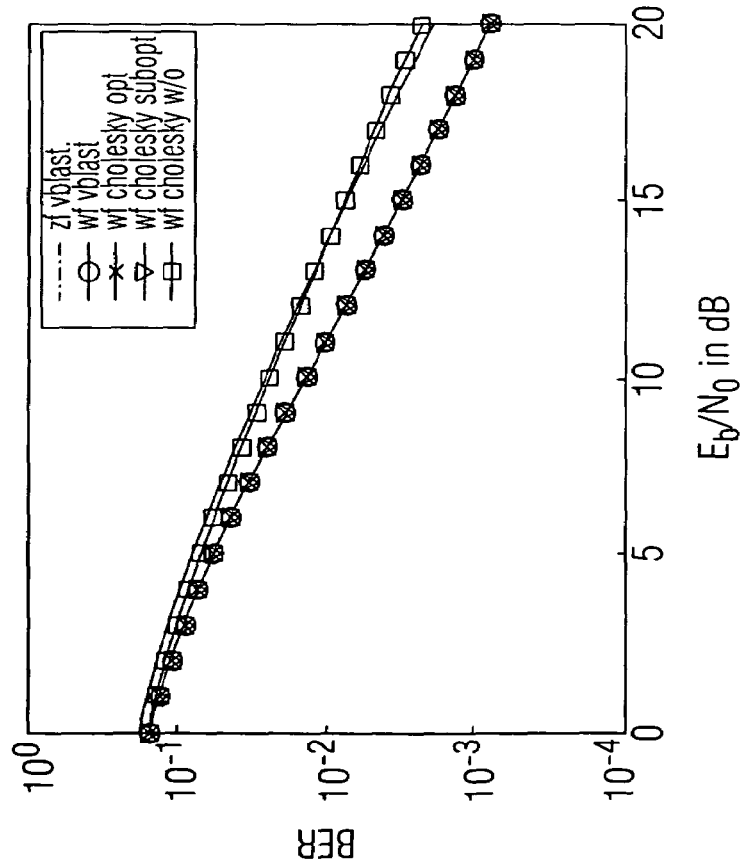
Figure 10:
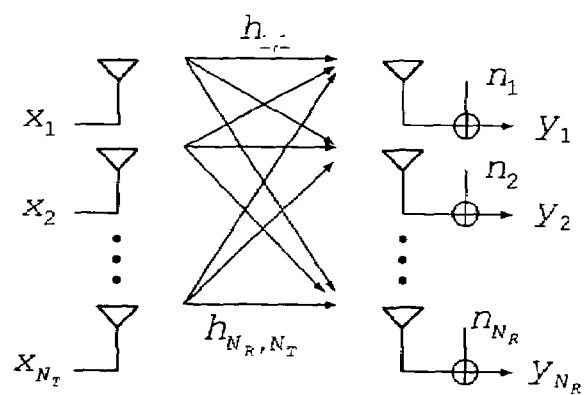
FIG. 10 shows a system model of a MIMO channel.
Figure 11:
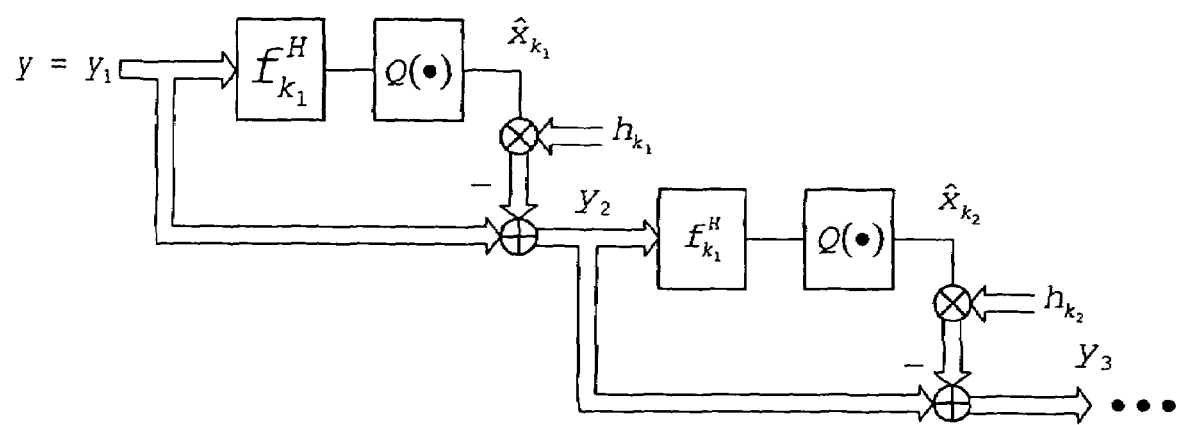
FIG. 11 shows a V-Blast structure.

FIGS. 9a and 9b show computer performance simulations, wherein FIG. 9a shows a bit error rates performance comparison for $N_T$ equals to 2 and $N_R$ equals to 2. FIG. 9b shows a bit error rates (BER) performance comparison for $N_T$ equals to 8 and $N_R$ equals to 8.

In the computer simulations, general input and noise are assumed to be white, i.e. $\Phi_{xx}=\sigma_x^2 \mathbf{1}$ and $\Phi_{nn}=\sigma_n^2 \mathbf{1}$. For the performance evaluation, bit error rate (BER) is computed over $E_b/N_0$, where $E_b$ and $N_0$ are average received energy per information bits and one-sided noise power spectral density, respectively. The signal to noise ratio (SNR) is defined as the ratio of total receive power to total noise power, which is $$SNR \triangleq \frac{E[\|Hx\|_2^2]}{E[\|n\|_2^2]} = \frac{N_T \sigma_x^2}{\sigma_n^2}$$

then, it relates to $E_b/N_0$ as $$\frac{E_b}{N_0} = SNR \frac{N_R}{N_T M} = \frac{N_R \sigma_x^2}{M \sigma_n^2}$$

wherein M is a number of bits per channel input.

The simulation results shown in FIG. 9a and 9b are for the case of 2 and 8 antennas at both transmitter and receiver, respectively. As can be seen from these figures, the performance of the proposed optimum ordered Cholesky method is as good as that of the optimum MMSE V-BLAST. Although the suboptimum ordered Cholesky approach performs as good as the optimum approach for two antennas, each performance degradation increases for 8 antennas and for high SNR, but still an advantage due to the ordering can be seen when compared to the Cholesky approach without ordering. For low SNR, the performance gap between optimum and suboptimum approaches becomes smaller, therefore suboptimum approach with further reduced complexity could be the optimum choice in such environment.

The inventive schemes realise a significant computational reduction. Originally proposed V-BLAST scheme requires two calculated matrix (pseudo) inversion N times where N is the number of transmit antennas or data streams. Complexity of matrix (pseudo) inversion is order of $N^3$, which is performed N times, consequently total complexity of V-BLAST is order of $N^4$ while the inventive schemes complexity is of order $N^3$.

The inventive estimation scheme is, moreover, faster than the fastest known prior art schemes disclosed in D. Wübben et al., MMSE Extension of V-Blast based on sorted QR Decomposition, Proceedings IEEE Vehicular Technology Conference (VTC' 2003-Fall), December 2003. Therein, the sorted QR Decomposition (SQRD) and PSA algorithms are disclosed. In particular, the proposed Cholesky suboptimum scheme is about twice as fast as the suboptimum SQRD while the performance is the same (suboptimum) for both schemes. The inventive Cholesky optimum scheme is furthermore about twice as fast as optimum SQRD+PSA disclosed in the above-mentioned document, where the performance for both is optimum (same as complexity expensive MMSE V-BLAST). Furthermore, the inventive Cholesky optimum method is faster than the suboptimum SQRD.

The complexity of the inventive scheme is less when compared with the known SQRD and the SQRD+PSA approach.

For uncorrelated noise and $N_T = N_R$, the complexities of the known SQRD and SQRD+PSA schemes are $$SQRD: \quad 2N_T^2 N_R + 2N_T^3 (4N_T^3)$$

$$SQRD + PSA: \quad 2N_T^2 N_R + \frac{11}{3} N_T^3 \left(\frac{17}{3} N_T^3\right)$$

Contrary thereto, the complexities of the inventive suboptimum Cholesky scheme and the optimum Cholesky scheme are $$\text{Suboptimum Cholesky:} \quad 2N_T^2 N_R + \frac{2}{3} N_T^3 \left(\frac{5}{3} N_T^3\right)$$

$$\text{Optimum Cholesky:} \quad 2N_T^2 N_R + \frac{5}{3} N_T^3 \left(\frac{8}{3} N_T^3\right)$$

For correlated noise, the complexities of the known SQRD and SQRD+PSA schemes are $$SQRD: \quad 2N_T^2 N_R + 2N_T^3 + \frac{2}{3} N_R^3 + N_T N_R^2 \left(\frac{17}{3} N_T^3\right)$$

$$SQRD + PSA: \quad \frac{2}{3} N_R^3 + N_T N_R^2 + 2N_T^2 N_R + \frac{23}{6} N_T^3 \left(\frac{15}{2} N_T^3\right)$$

Contrary thereto, the complexities of the inventive suboptimum Cholesky scheme and the optimum Cholesky scheme are $$\text{Suboptimum Cholesky:} \quad \frac{2}{3} N_R^3 + N_R^2 N_T + \frac{1}{2} N_T^2 N_R + \frac{2}{3} N_T^3 \left(\frac{17}{6} N_T^3\right)$$

$$\text{Optimum Cholesky:} \quad \frac{2}{3} N_R^3 + N_R^2 N_T + \frac{1}{2} N_T^2 N_R + \frac{5}{3} N_T^3 \left(\frac{23}{6} N_T^3\right)$$

For both cases, the complexity order is:

Inventive Cholesky suboptimum<inventive Cholesky optimum<SQRD<SQRD+PSA (worst case)

The performance of the inventive Cholesky suboptimum scheme corresponds to the performance of the SQRD scheme. Accordingly, the performances of the inventive Cholesky optimum scheme, of the SQRD+PSA scheme and of the MMSE V-BLAST schemes are the same, although the inventive Cholesky optimum scheme is less complex.

Regardless of the significant computational reduction, the performance of the inventive schemes is the same as that of V-BLAST, as has been mentioned above. No degradation is observed by computer simulations, hence an enormous capacity advantage remains. The resulting receiver structures in accordance with the present invention are furthermore simple so that a simple and low cost hardware implementation can be performed.

Depending on certain implementation requirements of the inventive methods, same can be implemented in hardware or in software. The implementation can be performed using a digital storage medium, in particular a disk or a CD having electronically readable control signals stored thereon, which can cooperate with a programmable computer system such that the inventive methods are performed. Generally, the present invention is, therefore, a computer program product with a program code stored on a machine-readable carrier, the program code being operative for performing the inventive method, when the computer program product runs on a computer. In other words, the inventive methods are, therefore, a computer program having a program code for performing the inventive methods when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. Apparatus providing an estimate of a transmit sequence from a receive sequence, the transmit sequence comprising $N_T$ transmit sequence values, wherein a transmit sequence value is transmittable by one of $N_T$ transmitting points through a communication channel of a plurality of communication channels to a receiving point of $N_R$ receiving points, wherein the communication channel extends from a transmitting point to a receiving point, wherein the receive sequence comprises an interference of transmit sequence values, the apparatus comprising:
provider for providing information on an estimation error associated with the estimate of transmit sequence;
calculator for calculating permutation information using the information on the estimation error;
a processor for processing the receive sequence to obtain a permuted filtered sequence, wherein the processor is operative for filtering using channel information and permuting using the permutation information such that the permuted filtered sequence values are in such an order that estimation error values associated with the values of the estimate of the transmit sequence are in a predetermined order;
an interference canceller for reducing interference using the permuted filtered sequence and the permutation information to provide the estimate of the transmit sequence, the interference canceller comprising a subtractor for subtracting a feedback sequence from the permuted filtered sequence for reducing the interference to provide an interference-reduced sequence, a decider for providing the estimate of the transmit sequence from the interference-reduced sequence, and a feedback element for weighting the estimate of the transmit sequence to provide the feedback sequence.

2. Apparatus in accordance with claim 1, wherein the provider for providing information on the estimation error is operative for calculating an error matrix as the information on the estimation error, such that a diagonal of the error matrix comprises estimation error values, wherein an estimation error value indicates an estimation error associated with a value of the estimate of the transmit sequence.

3. Apparatus in accordance with claim 2, wherein the provider for providing information on the estimation error is operative for calculating the error matrix from a minimization of a mean squared error between the permuted filtered sequence and the estimate of the transmit sequence, such that the estimation error values are mean squared error values.

4. Apparatus in accordance with claim 2, wherein the provider for providing information on the estimation error is operative for calculating the error matrix such that the error matrix comprises a transmit sequence covariance matrix or a noise covariance matrix or a channel matrix, the channel matrix comprising channel impulse responses of the plurality of communication channels.

5. Apparatus in accordance with claim 4, wherein the provider for providing information on the estimation error is operative for calculating the error covariance matrix $\Phi_{\epsilon\epsilon}$ from $$\Phi_{\epsilon\epsilon} = (\Phi_{xx}^{-1} + H^H \Phi_{nn}^{-1} H)^{-1}$$

wherein $\Phi_{xx}^{-1}$ denotes an inverse of a transmit sequence co-variance matrix, $\Phi_{nn}^{-1}$ denotes an inverse of the noise co-variance matrix and H denotes the channel matrix, wherein $(\bullet)^H$ denotes a conjugation and transposition.

6. Apparatus in accordance with claim 4, wherein the provider for providing information on the estimation error is operative for iteratively calculating the error covariance matrix or an inverse thereof from a previously calculated error covariance matrix or from an inverse thereof and from an update of information on the transmit sequence covariance matrix or on the channel matrix or on the noise co-variance matrix.

7. Apparatus in accordance with claim 1, wherein the calculator for calculating the permutation information is operative for calculating a permutation matrix $P_o$ as the permutation information based on the following equation $$P_o \Phi_{\epsilon\epsilon} P_o^T = LDL^H$$

or based on the following equation $$P_o \Phi_{\epsilon\epsilon}^{-1} P_o^T = LDL^H$$

wherein $\Phi_{\epsilon\epsilon}^{-1}$ denotes an inverse of the error matrix as the information on the estimation error, L denotes a lower triangular matrix comprising ones in a diagonal, and D denotes a diagonal matrix comprising estimation error values in the predetermined order.

8. Apparatus in accordance with claim 7, wherein the calculator for calculating the permutation information is operative for calculating the permutation matrix $P_o$ such that D comprises estimation error values in an ascending order or in a descending order as the predetermined order.

9. Apparatus in accordance with claim 7, wherein the calculator for calculating the permutation information is operative for calculating the permutation matrix from a factorization of a matrix, such that D comprises estimation error values in an ascending order as the predetermined order, wherein the calculator for calculating the permutation information comprises:
a minimum searcher for searching a minimum diagonal entry in the matrix;
a processor for reordering the matrix to provide a reordered matrix such that a first diagonal entry in the reordered matrix is the minimum diagonal entry; and
a processor for performing a factorization of the reordered matrix.

10. Apparatus in accordance with claim 1, wherein the processor is operative for filtering and permutating the receive sequence to provide the permuted filtered sequence according to a processing rule, which is defined as follows:

$$P_o H^H$$

wherein H is a channel matrix for filtering comprising channel impulse responses of the plurality of communication channels including the channel information, wherein $(\bullet)^H$ denotes transposition and conjugation, and wherein $P_o$ is a permutation matrix including the permutation information.

11. Apparatus in accordance with claim 10, wherein the processor is operative for filtering, permuting and weighting the receive sequence according to a processing rule defined as follows $$DL^H P_o H^H$$

wherein D is a diagonal matrix comprising estimation error values in an ascending or descending order as the predetermined order, and wherein L is a lower triangular matrix comprising ones in a diagonal.

12. Apparatus in accordance with claim 11, wherein the processor comprises a filter for filtering the receive sequence using filtering coefficients defined by $H^H$ to provide a filtered sequence, a permutator for permuting the filtered sequence using permuting coefficients defined by $P_o$ to provide a permuted sequence, weighter for weighting the permuted sequence using weighting coefficients defined by $L^H$ to provide a weighted sequence, and a further weighter for weighting the weighted sequence using the weighting coefficients defined by the matrix D to provide the permuted filtered sequence.

13. Apparatus in accordance with claim 10, wherein the processor is operative for filtering the receive sequence using noise information in accordance with a processing rule defined as follows $$DL^H P_o H^H \Phi_{nn}^{-1}$$

wherein $\Phi_{nn}^{-1}$ denotes an inverse of a noise covariance matrix.

14. Apparatus in accordance with claim 12, wherein the processor further comprises a noise filter for filtering the receive sequence to provide a noise filtered sequence as the receive sequence, the noise filter being operative for filtering the receive sequence using filter coefficients defined by an inverse of a noise covariance matrix.

15. Apparatus in accordance with claim 13, wherein the processor comprises a filter comprising filter coefficients for filtering the receive sequence to provide the permuted filtered sequence, and determiner for determining the filter coefficients, the determinor for determining the filter coefficients being operative for calculating the filter coefficients from the following expression $$DL^H P_o H^H \Phi_{nn}^{-1}.$$

16. Apparatus in accordance with claim 1, wherein the decider comprises permutator for permuting, the permutator for permuting being operative for permuting the interference-reduced sequence to provide a permuted interference-reduced sequence using the permutation information; and a detector for detecting the transmit sequence values from the permuted interference-reduced sequence values to provide the estimate of the transmit sequence.

17. Apparatus in accordance with claim 16, wherein the permutator for permuting is operative for multiplying the interference-reduced sequence by a matrix, which is a transpose of the permutation matrix $P_o$.

18. Apparatus in accordance with claim 1, wherein the feedback element comprises further permutator for permuting the estimate of the transmit sequence using the permutation information to provide a permuted estimate of the transmit sequence, and weighter for weighting the permuted estimate of the transmit sequence to provide the feedback sequence.

19. Apparatus in accordance with claim 18, wherein the permutator for permuting the estimate of the transmit sequence is operative for multiplying the estimate of the transmit sequence by a permutation matrix $P_o$, the permutation matrix including the permutation information.

20. Apparatus in accordance with claim 18, wherein the weighter for weighting the permuted estimate of the transmit sequence is operative for multiplying the permuted estimate of the transmit sequence by a matrix defined by $$L^{-1} - 1$$

wherein $L^{-1}$ is an inverse of a lower triangular matrix L comprising ones in a diagonal and wherein 1 denotes an identity matrix.

21. Apparatus in accordance with claim 20, further comprising an inverter for inverting the lower triangular matrix L to provide an inverse thereof.

22. Apparatus in accordance with claim 20, in which the interference canceller is operative for reducing interferences by performing a subtraction operation using the permuted filtered sequence.

23. Apparatus in accordance with claim 1, wherein the interference-reduced sequence comprises N values, wherein the decider comprises N detectors for detecting N values of the estimate of the transmit sequence.

24. Apparatus in accordance with claim 23, wherein the feedback element comprises $$(N^2-N)/2$$

multipliers for multiplying the first N–1 values of the estimate of the transmit sequence by weighting coefficients to provide the feedback sequence, wherein the weighting coefficients are coefficients of a matrix $$L^{-1} - 1$$

wherein $L^{-1}$ is an inverse of a lower triangular matrix L comprising ones in a diagonal.

25. Apparatus in accordance with claim 24, wherein the feedback sequence comprises N values, wherein the subtractor is operative for subtracting the N values of the feed-back sequence from the last N–1 values of the permuted filtered sequence to provide the interference-reduced sequence.

26. Apparatus in accordance with claim 25, wherein the feedback sequence comprises a first feedback sequence value, a second feedback sequence value and a third feedback sequence value, wherein the first feedback sequence value results from multiplying a first value of the estimate of the feedback sequence by a first weighting coefficient, wherein the second feedback sequence value results from multiplying the first value of the estimate of the transmit sequence by a second weighting coefficient, and wherein the third feedback sequence value results from multiplying a second value of the estimate of the transmit sequence by a third weighting coefficient, wherein the subtractor comprises a first subtraction element for subtracting the first feedback sequence value from a second per-muted filtered sequence value, and a second and a third subtraction element for subtracting the second feedback sequence value and the third feedback sequence value from a third permuted filtered sequence value.

27. Method for providing an estimate of a transmit sequence from a receive sequence, the transmit sequence comprising $N_T$ transmit sequence values, wherein a transmit sequence value is transmittable by one of $N_T$ transmitting points through a communication channel of a plurality of communication channels to a receiving point of $N_R$ receiving points, wherein the communication channel extends from a transmitting point to a receiving point, wherein the receive sequence comprises an interference of transmit sequence values, the method comprising the following steps:
- providing information on an estimation error associated with the estimate of the transmit sequence;
- calculating the permutation information using the information on the estimation error;
- processing the receive sequence to obtain a permuted filtered sequence using channel information and permutation information, the processing comprising filtering using channel information and permuting using the permutation information such that the permuted filtered sequence values are in such an order that estimation error values associated with the values of the estimate of the transmit sequence are in a predetermined order;
- interference cancelling for reducing interferences using the permuted filtered sequence and the permutation information to provide the estimate of the transmit sequence, the interference cancelling comprising subtracting a feedback sequence from the permuted filtered sequence for reducing the interference to provide an interference-reduced sequence, providing the estimate of the transmit sequence from the interference-reduced sequence by deciding on an estimate value in the estimate of the transmit sequence from a value in the interference-reduced sequence, and weighting the estimate of the transmit sequence to provide the feedback sequence.

28. A computer-readable medium tangibly embodying a computer program having a program code for performing the method for providing an estimate of a transmit sequence from a receive sequence, when the computer program runs on a computer, the transmit sequence comprising $N_T$ transmit sequence values, wherein a transmit sequence value is transmittable by one of $N_T$ transmitting points through a communication channel of a plurality of communication channels to a receiving point of $N_R$ receiving points, wherein the communication channel extends from a transmitting point to a receiving point, wherein the receive sequence comprises an interference of transmit sequence values, the method comprising the following steps:
- providing information on an estimation error associated with the estimate of the transmit sequence;
- calculating the permutation information using the information on the estimation error;
- processing the receive sequence to obtain a permuted filtered sequence using channel information and permutation information, the processing comprising filtering using channel information and permuting using the permutation information such that the permuted filtered sequence values are in such an order that estimation error values associated with the values of the estimate of the transmit sequence are in a predetermined order;
- interference cancelling for reducing interferences using the permuted filtered sequence and the permutation information to provide the estimate of the transmit sequence, the interference cancelling comprising subtracting a feedback sequence from the permuted filtered sequence for reducing the interference to provide an interference-reduced sequence, providing the estimate of the transmit sequence from the interference-reduced sequence by deciding on an estimate value in the estimate of the transmit sequence from a value in the interference-reduced sequence, and weighting the estimate of the transmit sequence to provide the feedback sequence.

* * * * *